United States Patent [19]

Lettner et al.

[11] Patent Number: 4,528,157
[45] Date of Patent: Jul. 9, 1985

[54] FEEDING OF MOLTEN STRANDS TO A DISCHARGE TROUGH

[75] Inventors: Horst H. Lettner, Glattbach; Friedrich Hunke, Grossostheim; Hans Hench, Inzlingen, all of Fed. Rep. of Germany

[73] Assignee: Automatik Apprate-Maschinenbau H. Hench GmbH, Grossostheim, Fed. Rep. of Germany

[21] Appl. No.: 466,714

[22] Filed: Feb. 15, 1983

[51] Int. Cl.³ ............................................. B29F 3/08
[52] U.S. Cl. ................................. 264/237; 264/143; 264/169; 264/178 F; 264/298; 425/69; 425/71; 425/215; 425/308
[58] Field of Search ............... 264/237, 143, 145, 169, 264/142, 298, 178 F; 425/66, 67, 70, 71, 308, 202, 377, 215–217, 69; 65/12

[56] References Cited

U.S. PATENT DOCUMENTS

| 2,871,512 | 2/1959 | Page et al. | 264/169 |
| 3,130,691 | 4/1964 | Amato | 425/313 |
| 3,277,656 | 10/1966 | Bill et al. | 264/180 |
| 3,311,688 | 3/1967 | Schuller | 264/349 |
| 3,837,781 | 9/1974 | Lambertus | 425/308 |
| 4,025,252 | 5/1977 | Hunke | 425/308 |
| 4,180,539 | 12/1979 | Clarke | 425/71 |
| 4,296,517 | 10/1981 | Bohler et al. | 264/169 |

FOREIGN PATENT DOCUMENTS

| 1046212 | 1/1979 | Canada | 425/308 |
| 1916222 | 11/1970 | Fed. Rep. of Germany | 425/71 |
| 2503455 | 1/1975 | Fed. Rep. of Germany | |
| 2559541 | 2/1977 | Fed. Rep. of Germany | 425/71 |
| 54-52161 | 4/1979 | Japan | 264/143 |
| 54-52164 | 4/1979 | Japan | 264/143 |
| 514707 | 6/1976 | U.S.S.R. | 425/67 |

Primary Examiner—Jeffery Thurlow
Attorney, Agent, or Firm—George E. Kersey

[57] ABSTRACT

Feeding of molten plastic strands into a discharge trough. At its upper end the discharge trough includes a slidably movable segment that can be extended behind the fall line of the strands as they emerge from nozzles. In its operating position, the extended segment catches the strands, and can be moved into a fore-running or non-operating position permitting free passage of the strands at the side of the discharge trough. A separational element is associated with the movable segment. As the segment is moved through the fall line of the strands, the separational element acts upon the strands and effects the desired separation. The strands which enter the discharge trough are cooled and ultimately fed to a granulator.

19 Claims, 9 Drawing Figures

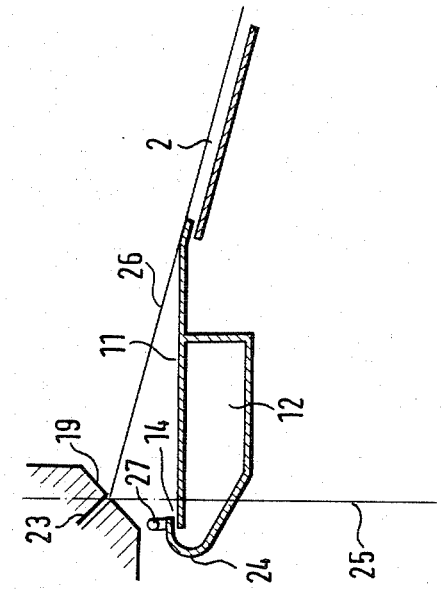
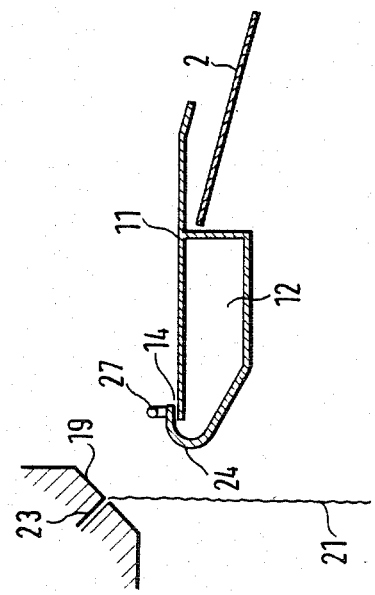
FIG. 4B
FIG. 4A

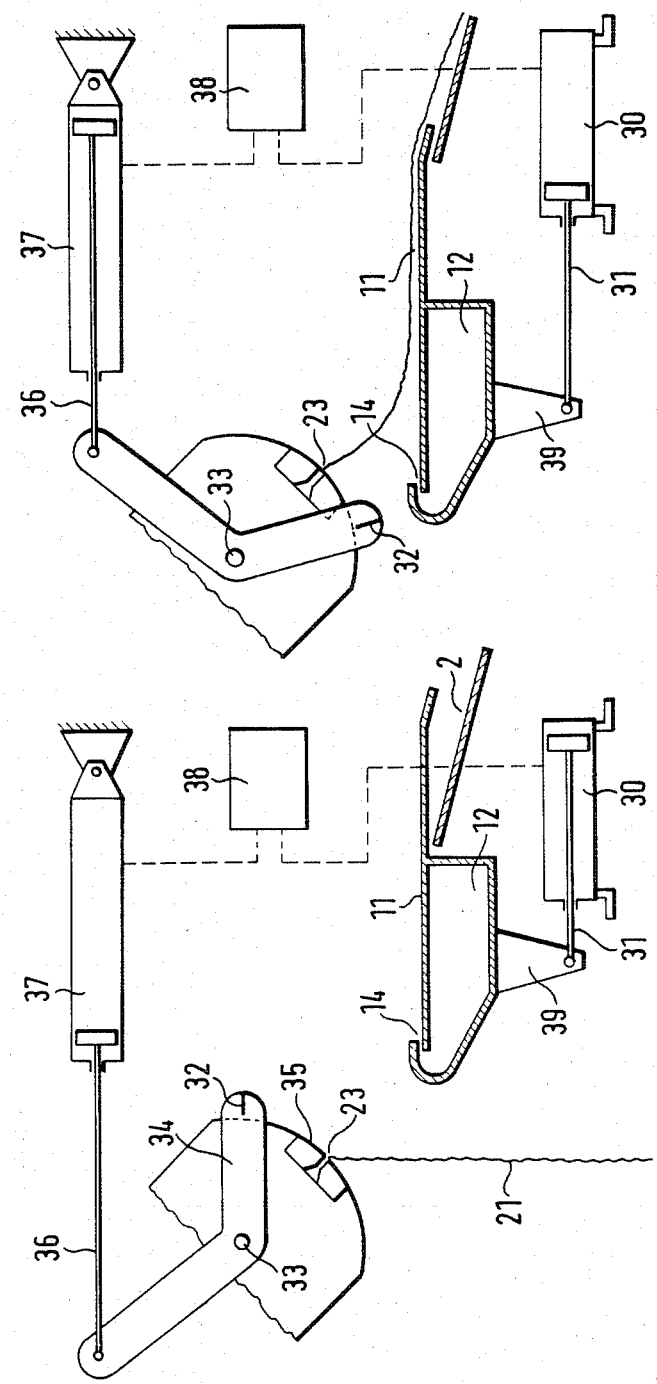

FEEDING OF MOLTEN STRANDS TO A DISCHARGE TROUGH

BACKGROUND OF THE INVENTION

This invention relates to the feeding of molten strands of plastic to a discharge trough, and, more particularly, to a discharge trough which is positionable either under or away from the fall line of the strands as they emerge from nozzles. When the trough is moved away from the strands, they fall freely beside it and are not collected in the trough.

A representative drainage trough for molten plastic strands is disclosed in German Pat. No. 2,503,455. The drainage trough of this patent has, at its upper end, a flap that is mounted on a perpendicular axle and can be pivoted to occupy one of two positions: An operating position and a non-operating position. In the operating position the flap is pivoted into contact with the trough to catch the emerging strands from the nozzles and feed them into the trough where coolant is applied. In the non-operating position, the flap is pivoted away from the trough so that the strands emerging from the nozzles fall between the flap and the trough.

When the flap is in its non-operating position, the material which initially emerges from the nozzles is kept from the trough since it generally contains contaminants or has not yet attained a final uniform composition. Under these circumstances, if the flap is moved to its operating position, it traverses the fall line of the strands which contact and become suspended from the flap. In order to prevent this occurrence, the flow of molten material can be terminated during the time interval when the flap is being moved from its non-operating to its operating position. Alternatively, the flow of molten material can be interrupted by having the operator use a stopping element at the nozzles. These procedures are disadvantageous and time consuming.

Accordingly, it is an object of the invention to facilitate the feed of molten strands of plastic to a collection trough.

A related object is to avoid the feed of contaminated and non-uniform plastic material to a collection trough. Another related object is to achieve the feed of relatively uniform strands of plastic material to a collection trough and avoid periodic stoppages for extensive cleaning and removal of contaminated and non-uniform materials from the collection trough.

Another object of the invention is to avoid the disadvantages associated with the use of a pivoted flap in connection with the operation of a collection trough and the associated spillage and soilage associated with the operation of such a flap.

SUMMARY OF THE INVENTION

In accomplishing the foregoing and related objects, the invention provides for associating a movable segment with the discharge trough such that the segment can be moved into an operating position for intercepting a molten strand of material emerging from a nozzle and guiding the strand into the discharge trough without having waste strands remaining suspended from the segment.

In accordance with one aspect of the invention, the segment is linearly movable with respect to the discharge trough along a slide guide from a non-operating position into an operating position. In the operating position, the segment catches the strand as it emerges and a separational element associated with the segment moves through the fall line of the strand to separate the previously emergent and waste portion of the strand from the subsequent emergent and collected portion of the strand.

In accordance with another aspect of the invention, the movability of the segment from its non-operating to its operating position assures that a clean separation can be made of the portion to be collected from the portion that previously emerged. As a result the collected material in the discharge trough is of high quality. In addition, the portion of the strand seized by the separational element during its movement from its non-operating position to its operating position can be kept from adhering to the segment and the strand which emerges following the seizure moves uninterruptedly over the segment into the discharge trough.

In accordance with a further aspect of the invention, the separational element becomes effective as the segment is moved through the fall line of the emerging strand. Accordingly, the separational element can be mounted on the segment or coupled to it. Thus the separational element can be affixed to its own guide and coupled to the segment by way of a control mechanism which provides the required sychronization of the segment and the separational element. The control mechanism may be an adaptation of control provided for other purposes in connection with the processing operation.

In accordance with still another aspect of the invention the separational element associated with the movable segment can be a stripping knife. When the segment moves into its operating position, the stripoing knife passes over a plate containing the nozzle, or nozzles, from which the material emerges and interrupts the emergents. During the period of interruption the segment moves through the fall line of the strand so that no material can adhere to its front side. The fresh material which emerges after the interruption by the separational element is properly conducted to the discharge trough.

In accordance with yet another aspect of the invention, it is possible to use a rod disposed at some distance above the movable segment as a separational element. As the segment moves into its operating position, the rod catches the emerging strand without cooling it significantly and holds it fast with respect to the material that continues to emerge until the captured strand is torn away. The captured strand is first suspended on the rod but its suspended portion then falls away because of gravity since the spatial separation of the rod from the upper end of the segment assures that the rod is not cooled. Consequently, the strand captured by the rod remains in its molten condition and its residual portion can easily fall away.

It is to be noted that German Auslegeschrift No. 2,230,187 discloses a device in which a slide is provided for intercepting and deflecting strands which emerge from extrusion nozzles when the slide is in its operating position. In the non-operating position of the slide the emerging strands fall into a cooling bath container. A knife associated with the slide cuts the plastic strands when the slide is positioned in its non-operating position.

By contrast with AUS No. 2,230,187 the invention provides a segment which is a component of a discharge trough and which conducts strands to the trough when the segment is in its operating position.

Conversely when the segment is in its non-operating position the emerging material falls freely beside it to keep it away from the material being processed. Thus, in the case of the invention, a component of the discharge trough, which does not exist in AUS No. 2,230,187 is used to allow imperfect strand material to fall freely without cooling so that it can be collected as waste and easily transported away in the form of a solid mass, e.g., waste cake. By contrast, in the case of AUS No. 2,230,187 the slide must be cooled since it actively deflects unprocessable strands away from the cooling bath container when the slide is in its operating position. Without cooling, strands would adhere to the slide and this type of deflection produces a skein of unprocessable strands which have a lower density and are therefore more difficult to handle than the waste cake which is associated with the practice of the invention.

DESCRIPTION OF THE DRAWINGS

Other aspects of the invention will become apparent after considering several illustrative embodiments, taken in conjunction with the drawings in which

FIG. 4A is a schematic view of an enlarged portion of FIG. 3 showing the movable segment and its associated separational rod in their non-operating position;

FIG. 4B is a schematic view showing the movable segment and associated separational rod in their operating position;

FIG. 6A is a schematic view showing a movable segment coupled to a stripping knife through a control mechanism, with both the segment and the knife in their non-operating positions; and FIG. 6B is a schematic view showing the constituents of FIG. 6A in their operating positions.

DETAILED DESCRIPTION

Figure 1:
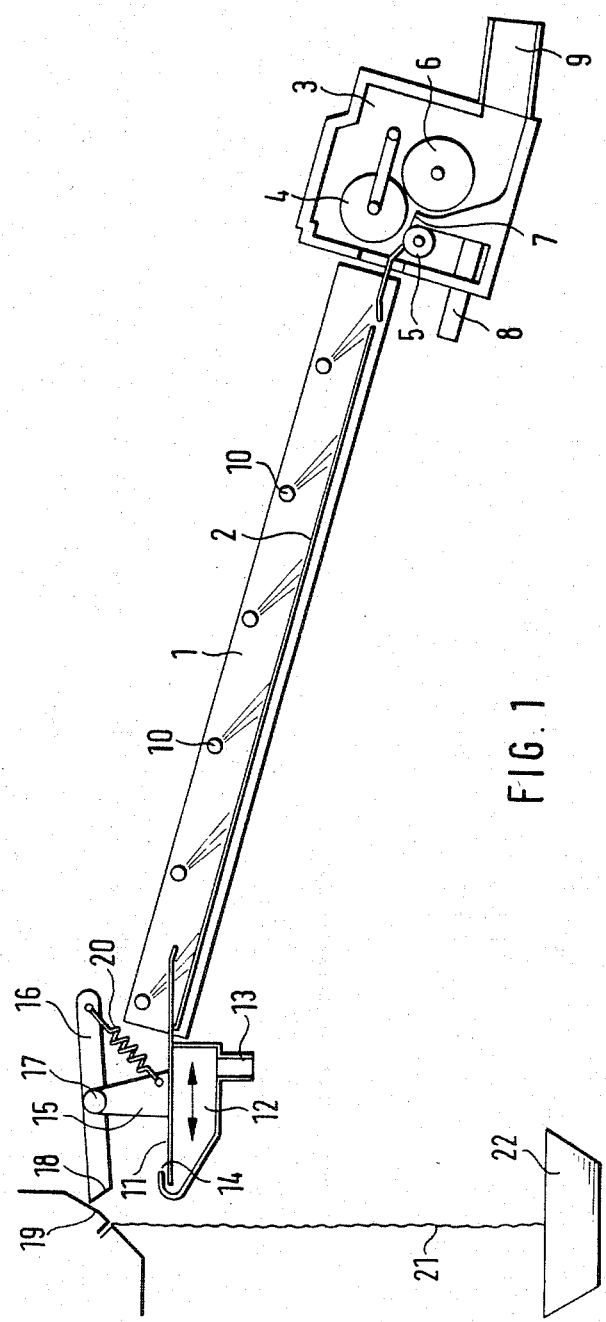
FIG. 1 is a schematic view showing a discharge trough with a movable segment mounting a stripping knife separational element for plastic material emerging from an extrusion nozzle.

With reference to the drawings, the invention makes use of a discharge trough 1 with structural components that are described in greater detail in previously noted German Pat. No. 2,503,455. The discharge trough 1 includes a base 2 over which plastic strands from a nozzle assembly 19 slide to a granulator 3 at the end of the discharge trough 1.

The granulator 3 contains the two pull-in rollers 4 and 5 as well as a milling cutter 6. The latter interacts with a counterblade 7 in well-known fashion. Cooling water is also fed into the granulator 3 through a connection 8. The granulate generated in the granulator 3, together with the cooling water, is then drained through an outlet 9. Spray nozzles 10, which are provided with cooling water, are disposed above the base 2. The nozzles provide an additional supply of cooling water along the discharge trough 1.

A movable segment 11 of the trough 1 is disposed at its upper end. The segment 11 can be moved back and forth horizontally in accordance with the indicated double headed arrow. The movable segment 11 forms the upper end of the discharge trough 1 and is thus a component of the trough. The movable segment 11 further contains a water tank 12, which is supplied with cooling water through an inlet 13. The water exits through a slot 14, formed by the movable segment 11 and a wall of the water tank 12. Water runs off through the segment 11 and then reaches the base 2 of the discharge trough 1. The direction of the slot 14 and the pressure at which the cooling water is fed into the water tank 12 assures that cooling water always flows from the slot 14 with considerable speed in the direction of the discharge trough 1.

A lever arm 16 is affixed to the water tank 12 through a support 15. At its center, the lever arm 16 is rotatably mounted on an axle 17. At its end away from the discharge trough 1, the lever 16 has a stripping knife 18 which contacts a nozzle plate 19. The stripping knife 18 is pressed against the nozzle plate 19 by a tension spring 20 connected to the lever 16.

In FIG. 1, the segment 11 is in its non-operating position. In this position, strands 21, which consist of unprocessable material, fall from the nozzle plate 19 and reach a waste container 22. To make a transition into the operating position, the segment 11 is moved towards the left from the position shown in FIG. 1. This operation is explained in more detail below in connection with FIGS. 2A and 2B.

Figure 2:
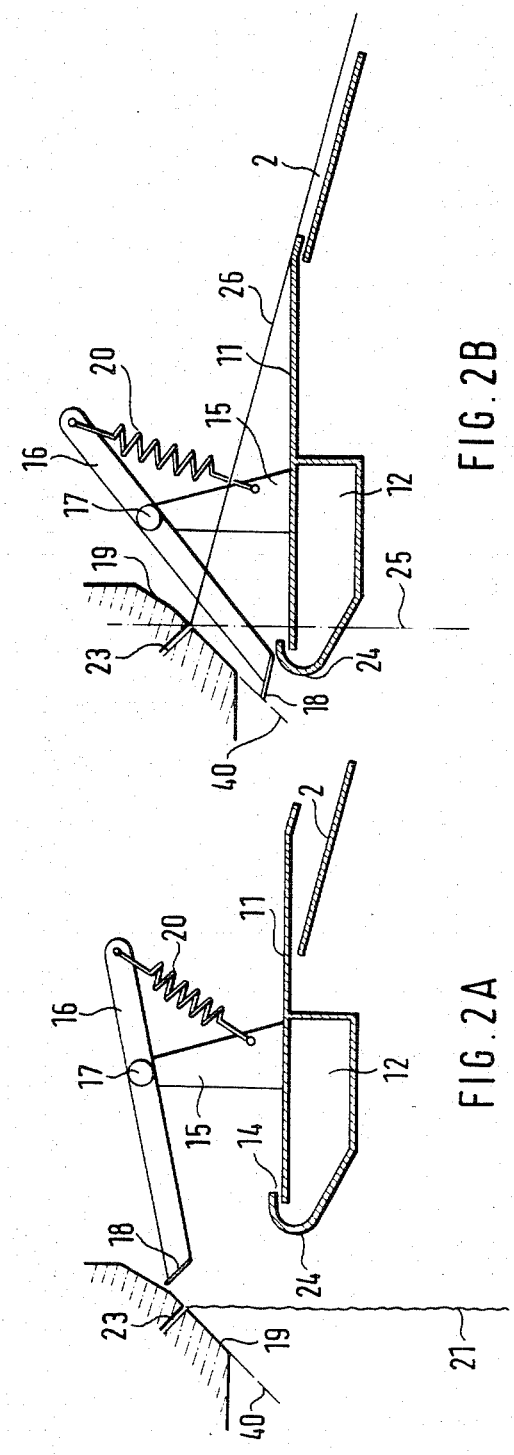
FIG. 2A is a schematic view of an enlarged portion of FIG. 1 showing the movable segment and its associated stripping knife in their non-operating position.
FIG. 2B is a schematic view showing the movable segment and associated stripping knife in their operating position.

FIG. 2A shows a section of FIG. 1, and specifically the movable segment 11 in its non-operating position, so that an unprocessable strand 21 falls freely from a nozzle 23 in the nozzle plate 19. In this position, the stripping knife 18 is in a preliminary position in front of the nozzle plate 19. By means of an advance mechanism (not shown), for example a pneumatically activated piston-cylinder unit, the movable segment 11 is moved to the left into the operating position shown in FIG. 2B.

As indicated in FIG. 2B, the stripping knife 18 is carried along and slides along the nozzle plate 19 because of the mechanical connection of the stripping knife 18 and the movable segment 11. This is the operating position of the segment 11, which now catches the strands emerging from the nozzle plate 19. During this process, the strands emerging at the nozzle plate 19 are immediately separated and interrupted, so that the strand material following the interruption falls on the segment 11 along the fall line 25 indicated by a dot and dashed line. The falling strand is seized by the current of cooling water that emerges from the slot 14. The cooling water then transports the fallen strand over the segment 11 in the direction towards floor 2 of the discharge trough. As a result, the strands, together with the cooling water, move over the floor 2, until the strands finally are seized by the granulator 3 shown in FIG. 1.

The granulator 3 exerts a pull on the strands in well-known fashion. The strands then assume the position that is indicated in FIG. 2B by reference symbol 26. In this operating position, the knife 18 is held by a sheath 40 indicated by a dash-dot line.

In this process, the strands emerging from the nozzle plate 19 are interrupted under the action of the stripping knife 18. At the same time, the front side 24 of the water tank 12 passes through the fall line 25 of the strands. If the interruption has been suitably adjusted, the front side 24 does not come in contact with any of the falling strands. However, if such contact should occur, this is not a problem since a strand cannot adhere to the front side 24 which is cooled by the cooling water. Thus, immediately after reaching the operating position shown in FIG. 2B, the strand falls off the front side 24.

In accordance with the invention, a changeover occurs automatically from the running or non-operating position in FIG. 2A to the operating position shown in FIG. 2B, without manipulation on the part of an operator and without any interruption in the flow of melt. In the first operating phase, the melt is conducted to a waste receptacle (not shown) in the form of strands 21. In the operating position shown in FIG. 2B, the melt is conducted to the base or floor 2 of the discharge trough. Here, a melt which is destined as waste cannot be present, so that the discharge trough contains only material of suitable quality after an transition has been made to the operating position shown in FIG. 2B.

Figure 3:
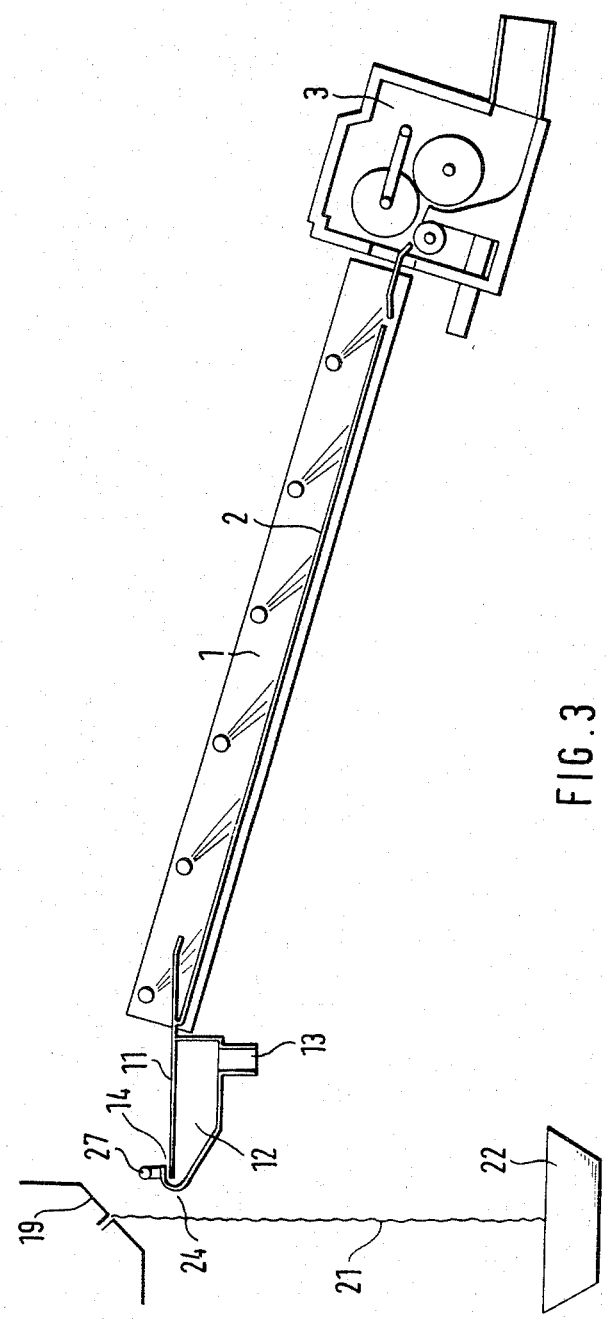
FIG. 3 is a schematic view of an alternative embodiment of the invention in which the separational element is a rod affixed to the movable segment of the discharge trough.

The device shown in FIG. 3 corresponds with the device according to FIG. 1 as regards the discharge trough 1, the granulator 3 and the water tank 12 with a movable segment 11. In addition, the device in FIG. 3 uses a rod 27 as a separational element. The rod 27 runs perpendicular to the strands 21, and parallel to the row of nozzles in the nozzle plate 19. The rod 27 is disposed above the slot 14 at a distance from the front side 24 which moves through the strands 21. Thus, it cannot be cooled by the cooling water which is supplied to the water tank 12.

The mode of operation of the rod 27 is explained in more detail with reference to FIGS. 4A and 4B. These figures indicate the the part of the device according to FIG. 3, which contains the water tank 12 with the segment 11, in both operating phases, namely the fore-running or non-operating position according to FIG. 4A, and the operating position according to FIG. 4B.

In the fore-running or non-operating position shown in FIG. 4A, the strands 21, which at first consist of unprocessable material, flow down from the nozzle 23 into a waste container (not shown in FIGS. 4A and 4B) corresponds to the container 22 in FIG. 3. To this extent, the operating phase shown in FIG. 4A corresponds to that shown in FIG. 2A. If the device is now brought into its operating position, the water tank 12 and the segment 11 are moved from the floor 2 of the discharge trough to the left into the operating position shown in FIG. 4B. Here, the front side 24 traverses the fall line 25, and the strand material is intercepted by the rod 27.

Figure 5:
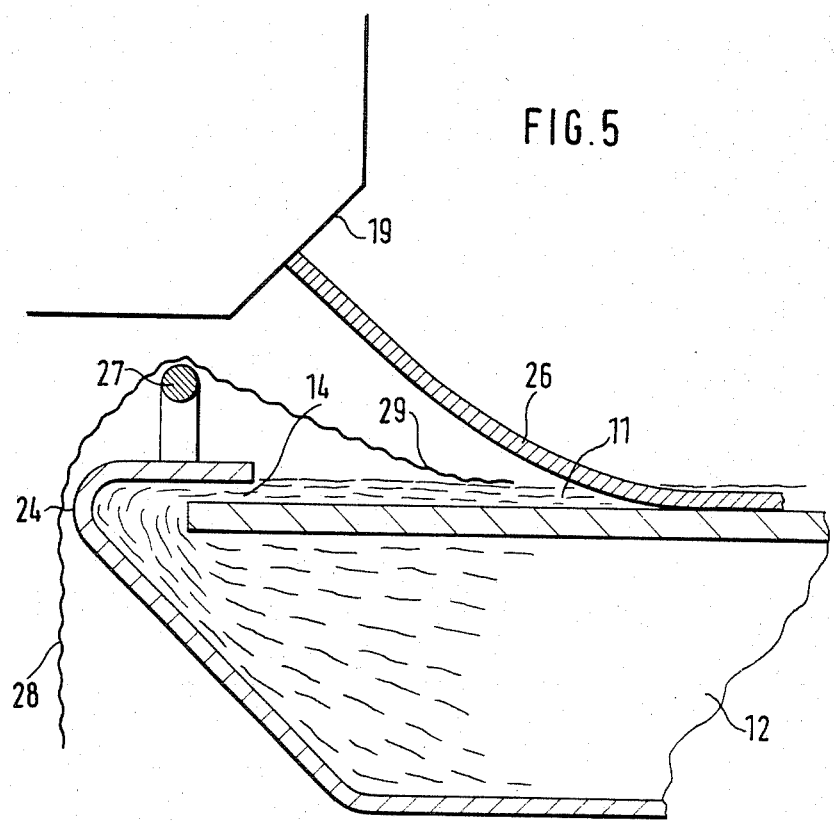
FIG. 5 is a schematic view of a further enlargement of the movable segment and associated separational rod in FIG. 3 showing the effect of operating the segment and capturing a prior portion of an emergent strand on the separational rod.

The action of the rod 27 is explained in more detail in connection with FIG. 5. When the rod 27 passes through the strands 21 (see FIG. 4A), the strands become suspended on the rod 27. Here they retain their temperature in the area of the rod 27, since the rod 27 is not cooled. Consequently, the ends of each suspended strand will elongate on both sides of the rod 27. One end 28 is directed toward the waste receptacle and the other end 29 is directed towards the movable segment 11. Finally, as a result of this elongation, the end 28 will finally fall from the rod 27 into the waste receptacle. The end 28 cannot adhere to the front side 24 because it is cooled.

The end 29 is then elongated by the strand 26 in its follow-on flow, which forms a loop in the direction towards the base 2, until the end 29 is finally torn off the rod 27. The strand 26 then continues to flow over the segment 11 in the direction towards the base 2 (see FIG. 4B), until finally the strand 26 is seized by the granulator 3 (see FIG. 3), and occupies the stretched position shown in FIG. 4B.

As can be seen, during this transition from the fore-running position (FIG. 4A) into the operating position (FIG. 4B), the rod 27 assures that the strands are seized by the rod 27, acting as a separational element, and are finally separated. In this way, an automatic changeover occurs from feeding the line of strands to the waste receptacle to feeding the line of strands to the discharge trough 1.

The motion of the separational element, e.g. the stripping knife 18 or the rod 27, can also be synchronized with the motion of the movable segment 11 by control coupling of these motions. A corresponding embodiment, based on a separation knife as a separational element, is shown in FIGS. 6A and 6B.

In FIG. 6A the device is shown in its fore-running or non-operating position, in which strands 21 fall freely from a nozzle 23. A pneumatically activated piston-cylinder 30 is provided to give the desired movement to the water tank 12. The piston-cylinder unit 30 has a tappet 31 which contacts an arm 39 which is fastened to the water tank 12. Because of the activation of the piston-cylinder unit 30, the water tank 12 and the segment 11 are moved into the operating position shown in FIG. 6B. This corresponds to the operations previously explained in connection with FIGS. 2A and 2B.

In FIGS. 6A and 6B, a stripping knife 32 is provided as the separational element. By means of the lever 34 which is mounted on an axle 33, the stripping knife 32 is moved over the nozzle plate 35, which illustratively has a cylindrical surface. The end of the lever 34 that is turned away from the stripping knife 32 is hinged to the piston rod 36 of the pneumatically activated piston-cylinder unit 37. When the piston rod 36 is activated, the lever 34 executes a swivel motion, which finally brings it into the operating position shown in FIG. 6B.

The motions of the movable segment 11 and of the stripping knife 32 are adjusted by a control unit 38, which is shown symbolically, so that a sequence of motions results of the kind described in connection with FIGS. 2A and 2B. In place of synchronization achieved by mechanical coupling of the segment 11 and the stripping knife 18, the synchronization is instead effected by the control unit 38. Such control units are well-known. They are used, for example, in packing machines, tool machines, and the like, for sequential control. Such a control can be used in connection with the invention described here, particularly when the basic device already contains a special control mechanism for other working sequences.

The control 38 therefore achieves the same effect in the sequence of motions as in the device according to FIGS. 3A and 2B. Consequently, as regards the mode of operation of the device according to FIGS. 6A and 6B, reference can be made also to the explanations previously given for FIGS. 2A and 2B. It is to be noted, in connection with the use of a special control, a rod, such as the rod 27, can also be used as the separational element. In such case, the rod must have its own advance mechanism, similar to the lever 34.

The device shown in FIG. 6 also can be used to remove oxidized melt deposits immediately at the nozzle exit. Such oxidations arise during the course of extended operation. Such material is useless for further processing. If it falls down from the nozzle plate spontaneously, it will be flushed along by the stream of water that flows over the movable segment 11 and will generally cause a contamination of the granulated material, particularly discloration. To prevent this, the device according to FIG. 6 can be moved back and forth during operation, that is from the operating position (FIG. 6B) to the fore-running or non-operating position (FIG. 6A) and back again into the operating position. The nozzle plate 35 is then scraped by the stripping knife 32, and the stripping knife 32 removes the above-mentioned oxidized material.

To prevent such oxidized material from falling from the stripping knife 32 onto the movable segment 11, the control 38 is adjusted so that the segment 11 is moved in advance of the position of the stripping knife 32 from its operating position (FIG. 6B) into its fore-running or non-operating position (FIG. 6A). Thus, the segment 11 is first brought from the operating position shown in FIG. 6B to its fore-running of non-operating position shown in FIG. 6A. Thereupon, the stripping knife 32 is brought from the position according to FIG. 6B into the position according to 6A. Oxidations which fall down at this time will therefore fall into the waste receptacle. The motion of the stripping knife 32 and of the segment 11 from the fore-running postion (FIG. 6A) into the operating position (FIG. 6A) then occurs in standard fashion.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. Apparatus including a slanting cooling discharge trough with an upper end that can be extended beneath the fall line of at least one strand of molten material emerging from a nozzle and can be retracted to permit the free passage of the strand away from the discharge trough, comprising
   a segment equipped with a separational element and movable independently said trough; and
   means for linearly moving said segment with respect to said trough from a non-operating position out of contact with said strand into an operating position where the strand emerging from said nozzle is captured by said segment to guide the strand into the cooling section of said discharge trough.

2. Apparatus in accordance with claim 1 characterized in that said separational element is fixed to said movable segment.

3. Apparatus in accordance with claim 1 characterized in that said separational element is movable dependently or independently with respect to said movable segment.

4. Apparatus in accordance with claim 3 characterized in that the movable separational element is a stripping knife which interrupts the emerging strand when said segment is moved into its operating position.

5. Apparatus in accordance with claim 4 characterized in that said stripping knife is pivoted on said movable segment and connected thereto by a tensioning spring.

6. Apparatus in accordance with claim 2 characterized in that said separational element comprises a rod disposed above the upper end of said movable segment and catches the emerging strand without significant cooling when said segment is moved into its operating position, the temperature of said rod permitting said strand to be held until the non-usable part thereof is able to fall freely from the end of said rod.

7. Apparatus in accordance with claim 1 characterized in that said movable segment has a coolant fluid flowing therethrough.

8. Apparatus in accordance with claim 7 characterized in that coolant fluid enters a bottom inlet of said movable segment and emerges over an upper surface thereof and joins the coolant in the remainder of said trough.

9. Apparatus in accordance with claim 1 characterized in that said separational element is movable independently of said segment and is coupled therewith through a control unit.

10. Apparatus in accordance with claim 9 characterized in that said separational element is a stripping knife which is pivotable with respect to the housing of said nozzle.

11. Apparatus in accordance with claim 10 characterized in that said stripping knife is pivoted with respect to said housing by a piston cylinder whose operation is coordinated with the movement of said segment by said control unit.

12. Apparatus in accordance with claim 11 characterized in that said segment is movable into its operating position by a piston cylinder under the control of said control unit.

13. Apparatus in accordance with claim 12 characterized in that when the piston of the cylinder of said segment is extended the corresponding piston associated with said stripping knife is retracted and vice versa.

14. The method of feeding at least one strand of molten material to a cooling discharge trough which comprises the steps of
   (a) providing a segment portion which is movable independently of said trough
   (b) extending said segment portion into the path of said strand emerging from a nozzle to capture the strand and guide it into said cooling portion of said trough.

15. The method in accordance with claim 14 wherein said segment is cooled independently of the remainder of said trough.

16. The method in accordance with claim 14 wherein said segment is provided with a separational element.

17. The method in accordance with claim 16 wherein said separational element is movable independently of said segment.

18. Apparatus for controlling the feed, to a discharge trough, of a strand of molten material, emerging from a nozzle, which comprises
   a segment which is movable independently of said trough into a position for intercepting said strand and guiding it to said trough, and is further movable out of the path of said strand to permit said strand to bypass said trough; and
   means associated with said segment for stripping said strand from said nozzle when said segment is moved into position for intercepting said strand.

19. Apparatus in accordance with claim 18 wherein the movement of the stripping means is coordinated with the movement of said segment.

* * * * *